United States Patent
Bao et al.

(10) Patent No.: US 12,189,058 B2
(45) Date of Patent: Jan. 7, 2025

(54) HIGH RESOLUTION LIDAR USING HIGH FREQUENCY PULSE FIRING

(71) Applicant: Innovusion, Inc., Sunnyvale, CA (US)

(72) Inventors: Junwei Bao, Los Altos, CA (US); Yimin Li, Cupertino, CA (US)

(73) Assignee: SEYOND, INC., Sunnyvale, CA (US)

( * ) Notice: Subject to any disclaimer, the term of this patent is extended or adjusted under 35 U.S.C. 154(b) by 47 days.

(21) Appl. No.: 17/958,308

(22) Filed: Sep. 30, 2022

(65) Prior Publication Data

US 2023/0027843 A1    Jan. 26, 2023

Related U.S. Application Data

(63) Continuation of application No. 16/209,697, filed on Dec. 4, 2018, now Pat. No. 11,493,601.

(Continued)

(51) Int. Cl.
*G01S 7/48* (2006.01)
*G01S 7/481* (2006.01)
(Continued)

(52) U.S. Cl.
CPC ........... *G01S 7/4811* (2013.01); *G01S 7/4817* (2013.01); *G01S 17/89* (2013.01); *G01S 17/931* (2020.01);
(Continued)

(58) Field of Classification Search
CPC ...... G01S 7/4817; G01S 17/931; G01S 17/10; G01S 7/484; G02B 26/101; G02B 26/10
See application file for complete search history.

(56) References Cited

U.S. PATENT DOCUMENTS 3,122,330 A    2/1964   Trentini
3,854,821 A   12/1974   Thompson
(Continued)

FOREIGN PATENT DOCUMENTS

CN    1677050 A    10/2005
CN    1322307 C     6/2007
(Continued)

OTHER PUBLICATIONS

Da-Peng, F. et al., "Overview of beam steering technology based on rotational double prisms," Chinese Optics, vol. 6, No. 2, 2013, pp. 136-150.

(Continued)

*Primary Examiner* — Christopher Stanford
(74) *Attorney, Agent, or Firm* — MASCHOFF BRENNAN; Ran Pang; Liang Huang

(57) ABSTRACT

The present disclosure describes a system and method for LiDAR scanning. The system includes a light source configured to generate one or more light beams; and a beam steering apparatus optically coupled to the light source. The beam steering apparatus includes a first rotatable mirror and a second rotatable mirror. The first rotatable mirror and the second rotatable mirror, when moving with respect to each other, are configured to: steer the one or more light beams both vertically and horizontally to illuminate an object within a field-of-view; redirect one or more returning light pulses generated based on the illumination of the object; and a receiving optical system configured to receive the redirected returning light pulses.

19 Claims, 11 Drawing Sheets

Related U.S. Application Data

(60) Provisional application No. 62/609,722, filed on Dec. 22, 2017.

(51) Int. Cl.
*G01S 17/89* (2020.01)
*G01S 17/931* (2020.01)
*G02B 26/10* (2006.01)
*G02B 26/12* (2006.01)

(52) U.S. Cl.
CPC ......... *G02B 26/101* (2013.01); *G02B 26/123* (2013.01)

(56) References Cited

U.S. PATENT DOCUMENTS

| | | |
|---|---|---|
| 3,897,150 A | 7/1975 | Bridges et al. |
| 4,412,720 A | 11/1983 | Costa |
| 4,413,878 A | 11/1983 | Lettington |
| 4,484,048 A | 8/1984 | Farlow |
| 4,923,263 A | 5/1990 | Johnson |
| 5,006,721 A | 4/1991 | Cameron et al. |
| 5,157,451 A | 10/1992 | Taboada et al. |
| 5,206,697 A | 4/1993 | Schwartz |
| 5,303,084 A | 4/1994 | Pflibsen et al. |
| 5,319,434 A | 8/1994 | Croteau et al. |
| 5,369,861 A | 11/1994 | Yamaguchi et al. |
| 5,442,358 A | 8/1995 | Keeler et al. |
| 5,510,890 A | 4/1996 | Langdon et al. |
| 5,546,188 A | 8/1996 | Wangler et al. |
| 5,579,153 A | 11/1996 | Laming et al. |
| 5,615,004 A | 3/1997 | Nourrcier, Jr. |
| 5,682,225 A | 10/1997 | DuBois et al. |
| 5,736,958 A | 4/1998 | Turpin |
| 5,793,491 A | 8/1998 | Wangler et al. |
| 5,838,239 A | 11/1998 | Stern et al. |
| 5,857,077 A | 1/1999 | Nakagaki et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,611,318 B2 | 8/2003 | LaPolice |
| 6,650,404 B1 | 11/2003 | Crawford |
| 6,783,074 B1 | 8/2004 | Hammer |
| 6,788,445 B2 | 9/2004 | Goldberg et al. |
| 6,864,498 B2 | 3/2005 | Katzir et al. |
| 6,950,733 B2 | 9/2005 | Stopczynski |
| 7,128,267 B2 | 10/2006 | Reichenbach et al. |
| 7,202,941 B2 | 4/2007 | Munro |
| 7,323,987 B2 | 1/2008 | Seas et al. |
| 7,345,271 B2 | 3/2008 | Boehlau et al. |
| 7,382,442 B2 | 6/2008 | Adachi et al. |
| 7,405,676 B2 | 7/2008 | Janssen |
| 7,440,084 B2 | 10/2008 | Kane |
| 7,440,175 B2 | 10/2008 | Di Teodoro et al. |
| 7,489,885 B2 | 2/2009 | Varshneya et al. |
| 7,541,943 B2 | 6/2009 | Manor |
| 7,541,944 B2 | 6/2009 | Konya et al. |
| 7,544,945 B2 | 8/2009 | Tan et al. |
| 7,576,837 B2 | 8/2009 | Liu et al. |
| 7,580,117 B2 | 8/2009 | Okada et al. |
| 7,675,655 B2 | 3/2010 | Marshall et al. |
| 7,679,788 B2 | 3/2010 | Sowa et al. |
| 7,697,120 B2 | 4/2010 | Reichert et al. |
| 7,830,527 B2 | 11/2010 | Chen et al. |
| 7,835,088 B2 | 11/2010 | Brooks et al. |
| 7,847,235 B2 | 12/2010 | Krupkin et al. |
| 7,880,885 B1 | 2/2011 | Tanaka et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,009,186 B2 | 8/2011 | Tomioka |
| 8,072,582 B2 | 12/2011 | Meneely |
| 8,116,988 B2 | 2/2012 | Jou et al. |
| 8,225,621 B2 | 7/2012 | Difatta et al. |
| 8,248,272 B2 | 8/2012 | Arnold et al. |
| 8,299,957 B2 | 10/2012 | Tseng |
| 8,420,698 B2 | 4/2013 | Lan-Hargest |
| 8,471,895 B2 | 6/2013 | Banks |
| 8,526,473 B2 | 9/2013 | Baird et al. |
| 8,629,977 B2 | 1/2014 | Phillips et al. |
| 8,659,643 B2 | 2/2014 | Purvis et al. |
| 8,659,748 B2 | 2/2014 | Dakin et al. |
| 8,681,319 B2 | 3/2014 | Tanaka et al. |
| 8,736,818 B2 | 5/2014 | Weimer et al. |
| 8,749,764 B2 | 6/2014 | Hsu |
| 8,812,149 B2 | 8/2014 | Doak |
| 8,836,955 B2 | 9/2014 | Alvarez Diez et al. |
| 8,842,356 B2 | 9/2014 | Sandner et al. |
| 8,918,270 B2 | 12/2014 | Wang |
| 8,976,339 B2 | 3/2015 | Phillips et al. |
| 8,994,928 B2 | 3/2015 | Shiraishi |
| 9,048,616 B1 | 6/2015 | Robinson |
| 9,085,243 B2 | 6/2015 | Asobe et al. |
| 9,086,273 B1 | 7/2015 | Gruver et al. |
| 9,188,674 B2 | 11/2015 | Suzuki et al. |
| 9,194,701 B2 | 11/2015 | Bosch |
| 9,239,959 B1 | 1/2016 | Evans et al. |
| 9,255,790 B2 | 2/2016 | Zhu |
| 9,278,662 B2 | 3/2016 | Steffey et al. |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,476,968 B2 | 10/2016 | Anderson et al. |
| 9,477,007 B2 | 10/2016 | Albert et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,606,222 B2 | 3/2017 | Bayha et al. |
| 9,618,742 B1 | 4/2017 | Droz et al. |
| 9,621,876 B2 | 4/2017 | Federspiel |
| 9,625,580 B2 | 4/2017 | Kotelnikov et al. |
| 9,638,799 B2 | 5/2017 | Goodwin et al. |
| 9,696,426 B2 | 7/2017 | Zuk |
| 9,702,966 B2 | 7/2017 | Batcheller et al. |
| 9,753,351 B2 | 9/2017 | Eldada |
| 9,778,384 B1 | 10/2017 | Gruver et al. |
| 9,791,555 B2 | 10/2017 | Zhu |
| 9,798,003 B2 | 10/2017 | Hammes et al. |
| 9,804,264 B2 | 10/2017 | Villeneuve et al. |
| 9,804,284 B2 | 10/2017 | Villeneuve et al. |
| 9,610,786 B2 | 11/2017 | Welford et al. |
| 9,812,838 B2 | 11/2017 | Villeneuve et al. |
| 9,817,121 B2 | 11/2017 | Inoue et al. |
| 9,823,351 B2 | 11/2017 | Haslim et al. |
| 9,823,353 B2 | 11/2017 | Eichenholz et al. |
| 9,857,468 B1 | 1/2018 | Eichenholz et al. |
| 9,857,472 B2 | 1/2018 | Mheen et al. |
| 9,869,753 B2 | 1/2018 | Eldada |
| 9,869,754 B1 | 1/2018 | Campbell et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,897,889 B2 | 2/2018 | Dussan |
| 9,915,726 B2 | 3/2018 | Bailey et al. |
| 9,923,329 B2 | 3/2018 | Savage-Leuchs et al. |
| 9,927,915 B2 | 3/2018 | Frame et al. |
| 9,958,545 B2 | 5/2018 | Eichenholz et al. |
| 9,989,755 B2 | 6/2018 | Fujimura et al. |
| 9,995,820 B2 | 6/2018 | Jachmann et al. |
| 10,007,001 B1 | 6/2018 | LaChapelle et al. |
| 10,012,732 B2 | 7/2018 | Eichenholz et al. |
| 10,018,724 B2 | 7/2018 | Royo Royo et al. |
| 10,031,214 B2 | 7/2018 | Rosenzweig et al. |
| 10,042,159 B2 | 8/2018 | Dussan et al. |
| 10,048,381 B2 | 8/2018 | Koehler |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |

(56) References Cited

U.S. PATENT DOCUMENTS

| | | |
|---|---|---|
| 10,107,914 B2 | 10/2018 | Kalscheur et al. |
| 10,157,630 B2 | 12/2018 | Vaughn et al. |
| 10,180,517 B2 | 1/2019 | Wiersema |
| 10,191,155 B2 | 1/2019 | Curatu |
| 10,203,399 B2 | 2/2019 | Retterath et al. |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Enberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,557,940 B2 | 2/2020 | Eichenholz et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,732,281 B2 | 8/2020 | LaChapelle |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,805 B2 | 5/2021 | Li et al. |
| 11,194,048 B1 | 12/2021 | Burbank et al. |
| 2001/0043717 A1 | 11/2001 | Laumeyer et al. |
| 2002/0136251 A1 | 9/2002 | Green et al. |
| 2002/0149760 A1 | 10/2002 | Hipp |
| 2002/0149781 A1 | 10/2002 | Saccomanno |
| 2003/0066954 A1 | 4/2003 | Hipp |
| 2003/0080285 A1 | 5/2003 | Hipp |
| 2004/0062442 A1 | 4/2004 | Laumeyer et al. |
| 2004/0135992 A1 | 7/2004 | Munro |
| 2005/0033497 A1 | 2/2005 | Stopczynski |
| 2005/0034036 A1 | 2/2005 | Lages et al. |
| 2005/0088641 A1 | 4/2005 | Hung et al. |
| 2005/0190424 A1 | 9/2005 | Reichenbach et al. |
| 2005/0195383 A1 | 9/2005 | Breed et al. |
| 2005/0218128 A1 | 10/2005 | Han |
| 2006/0071846 A1 | 4/2006 | Yanagisawa et al. |
| 2006/0132752 A1 | 6/2006 | Kane |
| 2006/0145062 A1 | 7/2006 | Boehlau et al. |
| 2006/0146377 A1 | 7/2006 | Marshall et al. |
| 2006/0227317 A1 | 10/2006 | Henderson et al. |
| 2007/0024840 A1 | 2/2007 | Fetzer et al. |
| 2007/0091948 A1 | 4/2007 | Di Teodoro et al. |
| 2007/0181810 A1 | 8/2007 | Tan et al. |
| 2007/0216995 A1 | 9/2007 | Bollond et al. |
| 2007/0248136 A1 | 10/2007 | Leonardo et al. |
| 2008/0174762 A1 | 7/2008 | Liu et al. |
| 2008/0193135 A1 | 8/2008 | Du et al. |
| 2008/0210881 A1 | 9/2008 | Harris et al. |
| 2008/0247426 A1 | 10/2008 | Welford |
| 2008/0264164 A1 | 10/2008 | Solheim et al. |
| 2009/0002678 A1 | 1/2009 | Tanaka et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0099813 A1 | 4/2009 | Dimsdale et al. |
| 2009/0102313 A1 | 4/2009 | West et al. |
| 2009/0147239 A1 | 6/2009 | Zhu |
| 2009/0245302 A1 | 10/2009 | Baird et al. |
| 2009/0252376 A1 | 10/2009 | Retterath et al. |
| 2009/0262760 A1 | 10/2009 | Krupkin et al. |
| 2009/0316134 A1 | 12/2009 | Michael et al. |
| 2009/0324293 A1 | 12/2009 | Tomioka |
| 2010/0006760 A1 | 1/2010 | Lee et al. |
| 2010/0007870 A1 | 1/2010 | Haberer et al. |
| 2010/0020306 A1 | 1/2010 | Hall |
| 2010/0020377 A1 | 1/2010 | Brochers et al. |
| 2010/0025798 A1 | 2/2010 | Itzler et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0114416 A1 | 5/2010 | Au et al. |
| 2010/0128109 A1 | 5/2010 | Banks |
| 2010/0128248 A1 | 5/2010 | Heizmann et al. |
| 2010/0165082 A1 | 7/2010 | Kiehn et al. |
| 2010/0271614 A1 | 10/2010 | Albuquerque et al. |
| 2010/0302628 A1 | 12/2010 | Hall |
| 2011/0032508 A1 | 2/2011 | Ludwig et al. |
| 2011/0085155 A1 | 4/2011 | Stann et al. |
| 2011/0102784 A1 | 5/2011 | Walsh et al. |
| 2011/0122895 A1 | 5/2011 | Savage-Leuchs et al. |
| 2011/0161031 A1 | 6/2011 | Dimsdale et al. |
| 2011/0181864 A1 | 7/2011 | Schmitt et al. |
| 2011/0216304 A1 | 9/2011 | Hall |
| 2011/0235019 A1 | 9/2011 | Matsubara et al. |
| 2012/0035788 A1 | 2/2012 | Trepagnier et al. |
| 2012/0038903 A1 | 2/2012 | Weimer et al. |
| 2012/0101680 A1 | 4/2012 | Trepagnier et al. |
| 2012/0124113 A1 | 5/2012 | Zalik et al. |
| 2012/0162373 A1 | 8/2012 | Mheen et al. |
| 2012/0219020 A1 | 8/2012 | Fermann et al. |
| 2012/0221142 A1 | 8/2012 | Doak |
| 2013/0050676 A1 | 2/2013 | d'Aligny |
| 2013/0087689 A1 | 4/2013 | Woodward et al. |
| 2013/0107016 A1 | 5/2013 | Federspeil |
| 2013/0116971 A1 | 5/2013 | Retkowski et al. |
| 2013/0235366 A1 | 9/2013 | Giacotto et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0027607 A1 | 1/2014 | Mordarski et al. |
| 2014/0063255 A1 | 3/2014 | Breed |
| 2014/0063489 A1 | 3/2014 | Steffey et al. |
| 2014/0078514 A1 | 3/2014 | Zhu |
| 2014/0104594 A1 | 4/2014 | Gammenthaler |
| 2014/0233842 A1 | 8/2014 | Kanter |
| 2014/0300952 A1 | 10/2014 | Gusev et al. |
| 2014/0319638 A1 | 10/2014 | Chia |
| 2014/0320845 A1 | 10/2014 | Bayha et al. |
| 2014/0327945 A1 | 11/2014 | Weiss et al. |
| 2014/0332676 A1 | 11/2014 | Bayha et al. |
| 2014/0347650 A1 | 11/2014 | Bosch |
| 2014/0350836 A1 | 11/2014 | Stettner et al. |
| 2015/0055117 A1 | 2/2015 | Pennecot et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0131080 A1 | 5/2015 | Retterath et al. |
| 2015/0139259 A1 | 5/2015 | Robinson |
| 2015/0153271 A1 | 6/2015 | Retterath et al. |
| 2015/0158489 A1 | 6/2015 | Oh et al. |
| 2015/0160007 A1 | 7/2015 | Xu et al. |
| 2015/0266472 A1 | 9/2015 | Ferguson et al. |
| 2015/0293228 A1 | 10/2015 | Retterath et al. |
| 2015/0332102 A1 | 11/2015 | Lu et al. |
| 2015/0338270 A1 | 11/2015 | Williams et al. |
| 2015/0355327 A1 | 12/2015 | Goodwin et al. |
| 2015/0378012 A1 | 12/2015 | Sayyah et al. |
| 2016/0003946 A1 | 1/2016 | Gilliland et al. |
| 2016/0047895 A1 | 2/2016 | Dussan |
| 2016/0047896 A1 | 2/2016 | Dussan |
| 2016/0047900 A1 | 2/2016 | Dussan |
| 2016/0061655 A1 | 3/2016 | Nozawa |

(56) References Cited

U.S. PATENT DOCUMENTS

| | | | |
|---|---|---|---|
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0025019 A1 | 1/2017 | Pink et al. |
| 2017/0070029 A1 | 3/2017 | Moeneclaey et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0356981 A1 | 12/2017 | Yang et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152891 A1 | 5/2018 | Pacala et al. |
| 2018/0158471 A1 | 6/2018 | Vaughn et al. |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284244 A1 | 10/2018 | Russell et al. |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0011587 A1 | 1/2019 | Pacala et al. |
| 2019/0025428 A1 | 1/2019 | Li et al. |
| 2019/0094345 A1 | 3/2019 | Singer et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0142073 A1 | 5/2020 | Gassend et al. |
| 2020/0142075 A1 | 5/2020 | Lee |
| 2020/0142076 A1 | 5/2020 | Gulo et al. |
| 2020/0227882 A1 | 7/2020 | Zhang et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |
| 2021/0158966 A1 | 5/2021 | Bao et al. |

FOREIGN PATENT DOCUMENTS

| | | |
|---|---|---|
| CN | 101093285 A | 12/2007 |
| CN | 101241182 A | 8/2008 |
| CN | 101576620 A | 11/2009 |
| CN | 102736075 A | 10/2012 |
| CN | 104995482 A | 10/2015 |
| CN | 204758260 U | 11/2015 |
| CN | 204885804 U | 12/2015 |
| CN | 105319555 A | 2/2016 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| GB | 2487518 A | 7/2012 |
| JP | S63106587 A | 5/1888 |
| JP | S5085348 A | 7/1978 |
| JP | H04223422 A | 8/1992 |
| JP | 2007144667 A | 6/2007 |
| JP | 2007301756 A | 11/2007 |
| JP | 2008070159 A | 3/2008 |
| JP | 2010035385 A | 2/2010 |
| JP | 2010060309 A | 3/2010 |
| JP | 2011257193 A | 12/2011 |
| JP | 2012211831 A | 11/2012 |
| JP | 2013238440 A | 11/2013 |
| JP | 2014071038 A | 4/2014 |
| JP | 2015152427 A * | 8/2015 |
| JP | 2018040662 A | 3/2016 |
| JP | 2017-003347 A | 1/2017 |
| JP | 2017-138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 9222109 A1 | 12/1992 |
| WO | 2012051700 A1 | 4/2012 |
| WO | 2016002776 A1 | 1/2016 |

(56) References Cited

FOREIGN PATENT DOCUMENTS

| WO | 2016175395 A2 | 11/2016 |
|---|---|---|
| WO | 2017/110417 A1 | 6/2017 |
| WO | 2018/125725 A1 | 7/2018 |
| WO | 2018/129410 A1 | 7/2018 |
| WO | 2018128248 A1 | 7/2018 |
| WO | 2018129408 A1 | 7/2018 |
| WO | 2018129409 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

Noguchi, H. et al., "Capturing device for dense point cloud of indoor people using horizontal LIDAR and pan rotation of vertical LIDAR with mirrors," 2012 IEEE/SICE International Symposium on System Integration (SII), Fukuoka, Japan, 2012, pp. 428-433.
International Search Report and Written Opinion issued in International Application No. PCT/US2018/065455, dated Jul. 17, 2019, 21 pages.
"Mirrors", Physics LibreTexts, https://phys.libretexts.org/Bookshelves/Optics/Supplemental_Modules_(Components)/ Mirrors, (2021), 2 pages.
"Why Wavelengths Matter in Fiber Optics", FirstLight, https://www.firstlight.net/why-wavelengths-matter-in-fiber-optics/, (2021), 5 pages.
Chen, X. et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
First Office Action dated Jan. 2, 2024 for Chinese Patent Application No. 201880090039.3, 24 pages.

* cited by examiner

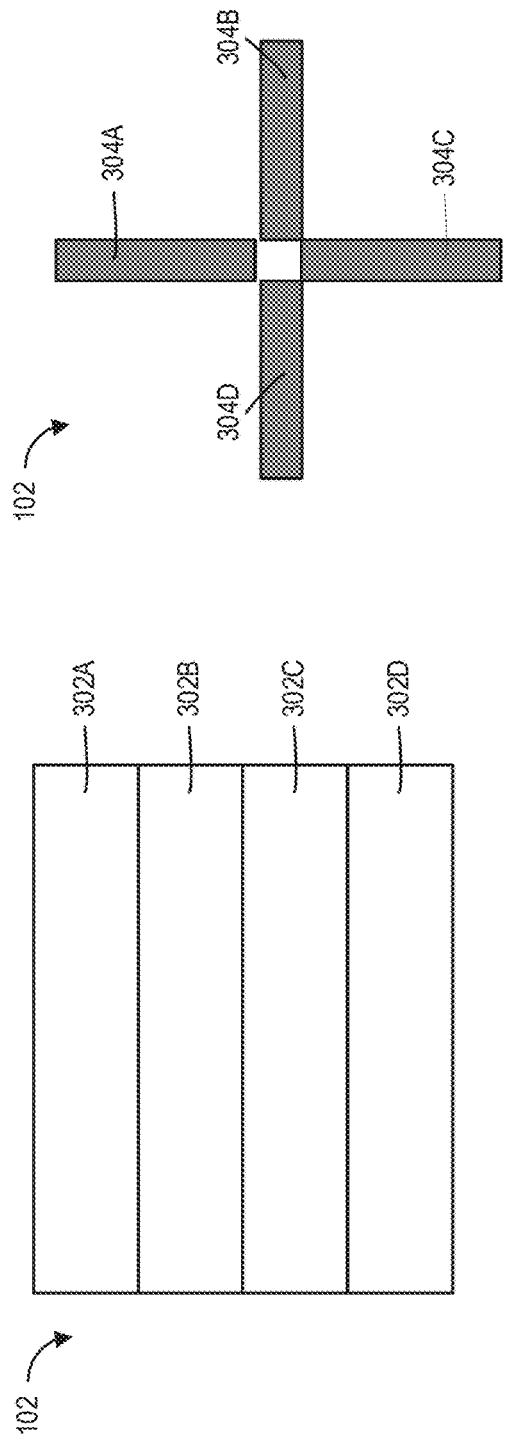
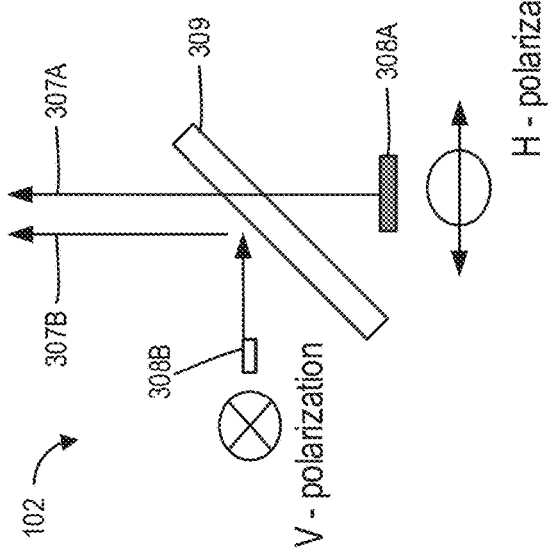
FIG. 3A
FIG. 3B
FIG. 3C

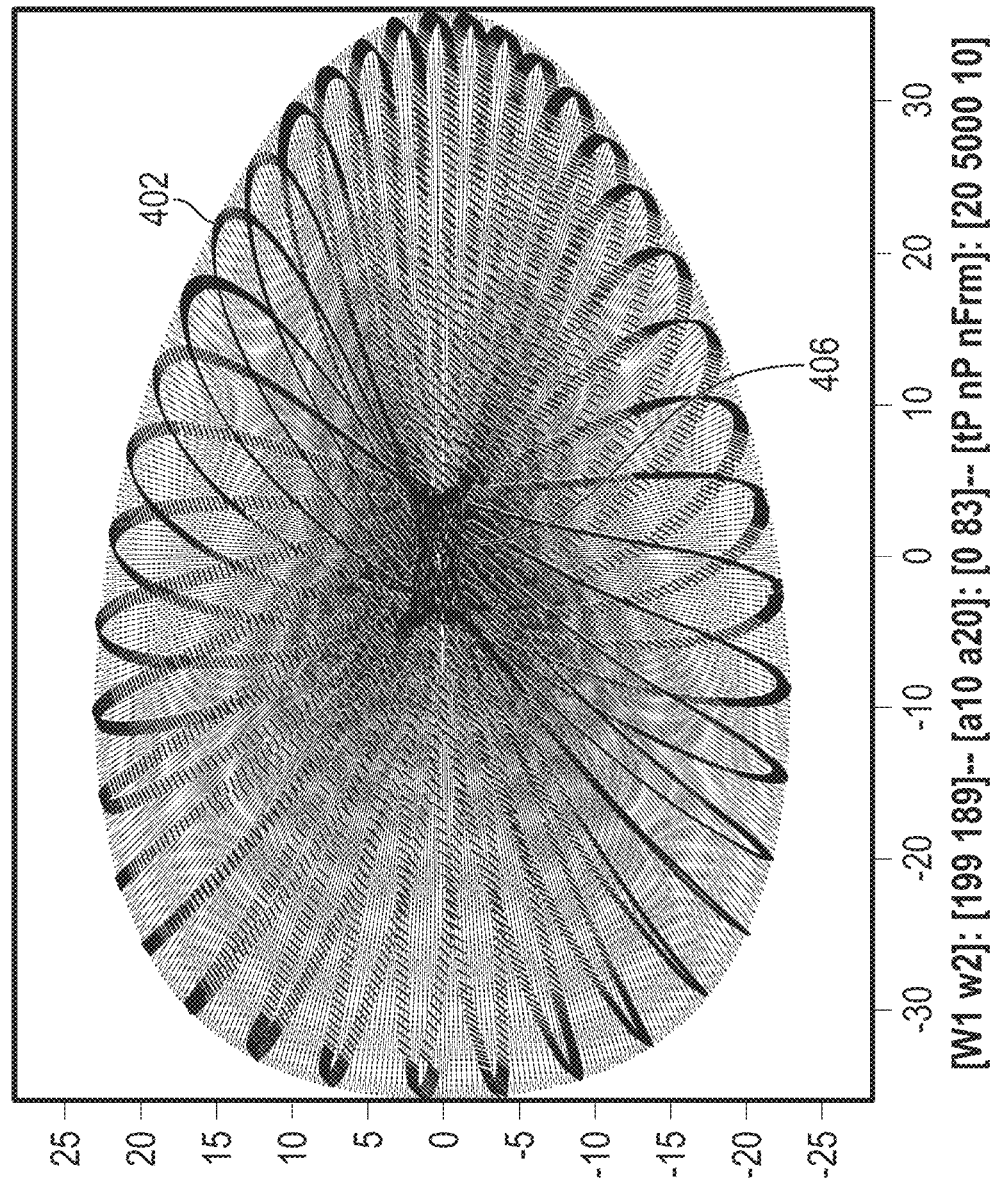

HIGH RESOLUTION LIDAR USING HIGH FREQUENCY PULSE FIRING

CROSS-REFERENCE TO RELATED APPLICATIONS

This application is a continuation application of U.S. patent application Ser. No. 16/209,697, filed on Dec. 4, 2018, which claims priority to U.S. provisional patent application No. 62/609,722, entitled "HIGH DENSITY LIDAR SCANNING," filed on Dec. 22, 2017. The contents of both applications are hereby incorporated by reference in their entireties for all purposes.

FIELD OF THE DISCLOSURE

The present disclosure generally relates to light detection and ranging (LiDAR) systems and, more specifically, to systems for providing high density LiDAR scanning of objects in a field-of-view.

BACKGROUND OF THE DISCLOSURE

A LiDAR system transmits light pulses to illuminate objects in a field-of-view and collect returning light pulses. Based on the returning light pulses, the LiDAR system calculates the time-of-flight and in turn determines the distance of a particular object. Typically, not all returning light pulses are collected by a LiDAR system due to the limited aperture for collecting the returning light pulses.

SUMMARY OF THE DISCLOSURE

The following presents a simplified summary of one or more examples in order to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

In accordance with some embodiments, a light detection and ranging (LiDAR) scanning system is provided. The system includes a light source configured to generate one or more light beams; and a beam steering apparatus optically coupled to the light source. The beam steering apparatus includes a first rotatable mirror and a second rotatable mirror. An axis that is perpendicular to a reflective surface of the first rotatable mirror is configured to be at a first angle to a first rotating axis of the first rotatable mirror, and an axis that is perpendicular to a reflective surface of the second rotatable mirror is configured to be at a second angle to a second rotating axis of the second rotatable mirror. At least one of the first angle or the second angle is greater than zero degree and less than 90 degree. The first rotatable mirror and the second rotatable mirror, when moving with respect to each other, are configured to: steer the one or more light beams both vertically and horizontally to illuminate an object within a field-of-view; redirect one or more returning light pulses generated based on the illumination of the object; and a receiving optical system configured to receive the redirected returning light pulses.

In accordance with some embodiments, a scanning system that is disposed with a vehicle is provided. The system includes a first light detection and ranging (LiDAR) scanning system disposed approximately at a front-left corner of the vehicle; a second LiDAR scanning system disposed approximately at a front-right corner of the vehicle; and a third LiDAR scanning system disposed approximately at a top portion of a front window-shield of the vehicle.

In accordance with some embodiments, a light detection and ranging (LiDAR) scanning system is provided. The system includes a light source configured to generate one or more light beams; and a beam steering apparatus optically coupled to the light source. The beam steering apparatus includes a first mirror and a rotatable mirror. The first mirror is an oscillation mirror or a Galvo mirror. An axis that is perpendicular to a reflective surface of the first mirror is configured to be at a first angle to an oscillation axis of the first mirror, and an axis that is perpendicular to a reflective surface of the rotatable mirror is configured to be at a second angle to a second rotating axis of the second rotatable mirror. At least one of the first angle or the second angle is greater than zero degree and less than 90 degree. The first mirror and the rotatable mirror, when moving with respect to each other, are configured to: steer the one or more light beams both vertically and horizontally to illuminate an object within a field-of-view; redirect one or more returning light pulses generated based on the illumination of the object; and a receiving optical system configured to receive the redirected returning light pulses.

BRIEF DESCRIPTION OF THE DRAWINGS

For a better understanding of the various described aspects, reference should be made to the description below, in conjunction with the following figures in which like-referenced numerals refer to corresponding parts throughout the figures.

FIGS. 3A-3C illustrates an exemplary configurations of a light source.

FIG. 4A illustrates exemplary scanning results of an exemplary LiDAR scanning system that includes a light source having multiple light emitting devices.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Examples of LiDAR scanning systems will now be presented with reference to various elements of apparatus and methods. These apparatus and methods will be described in the following detailed description and illustrated in the accompanying drawing by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

A typical LiDAR scanning system has limited apertures for collecting returning light pulses. Increasing the apertures are thus desired. The various configuration of LiDAR systems described in this application can increase the aperture for collecting returning light pulses. In turn, the increased aperture improves the scanning range in both horizontal and vertical scanning directions, and therefore enables detecting more objects in the field-of-view. In addition, the various configuration of LiDAR systems described in this application can also provide overlapping scanning results in a pre-determined scanning range (e.g., short distances from the vehicle in both horizontal and vertical directions). The overlapping scanning results obtained for the pre-determined scanning range can thus provide a high density scanning, resulting in a high-resolution image. Moreover, various configuration of disposing multiple LiDAR systems in a vehicle can reduce or eliminate possible scanning gaps where objects in the field-of-view may not be detected. This in turn reduces or eliminates the likelihood that a vehicle collide with the undetected objects.

Although the examples of the disclosure are described for integration in a vehicle, other applications are contemplated. For example, a centralized laser delivery system and multiple LiDAR systems can be disposed in or integrated with robots, installed at multiple locations of a building for security monitoring purposes, or installed at traffic intersections or certain location of roads for traffic monitoring, etc.

Figure 1:
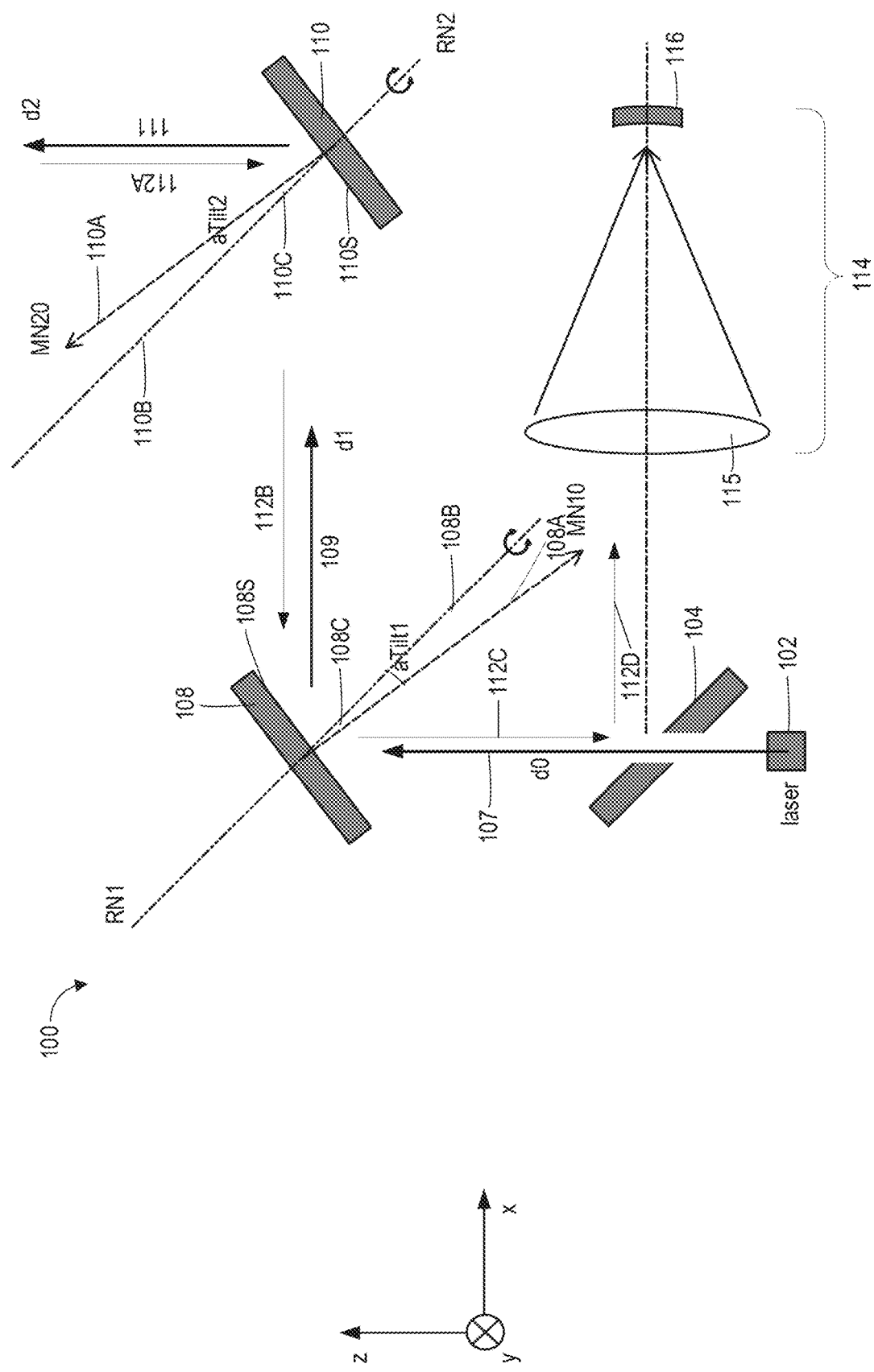
FIG. 1 illustrates an exemplary LiDAR scanning system that includes a beam steering apparatus having two rotatable mirrors.

FIG. 1 illustrates an exemplary LiDAR scanning system 100 that includes a beam steering apparatus having two rotatable mirrors 108 and 110. LiDAR scanning system 100 can be 2D or 3D scanning LiDAR system. In some embodiments, LiDAR scanning system 100 includes a light source 102, an optical element 104, a first rotatable mirror 108, a second rotatable mirror 110, and a receiving optical system 114. As illustrated in FIG. 1, first rotatable mirror 108 and second rotatable mirror 110, when moving with respect to each other, can be configured to steer one or more light beams 107 both vertically and horizontally to illuminate one or more objects within the field-of-view of LiDAR scanning system 100, and redirect one or more returning light pulses generated based on the illumination of the objects. Light source 102 can generate one or more light beams 107 that include incident light pulses. Light source 102 can be a laser light source such as a fiber laser, a diode laser, a diode pump solid state laser, and/or a fiber coupled diode laser. In some examples, the laser light generated by light source 102 can have a wavelength in the visible spectrum. In some examples, the laser light can have a wavelength in the infrared spectrum. In some examples, the laser light can have a wavelength in the ultra violet spectrum.

As illustrated in FIG. 1, one or more light beams 107 that include incident light pulses are transmitted toward first rotatable mirror 108 via an optical element 104. In some embodiments, optical element 104 can include a lens and/or an opening for focusing and/or directing light beams 107 to first rotatable mirror 108. In some embodiments, first rotatable mirror 108 can redirect the incident light pulses of light beams 107 toward second rotatable mirror 110. As illustrated in FIG. 1, first rotatable mirror 108 can generate redirected light pulses 109 based on incident light pulses of light beams 107. First rotatable mirror 108 can be configured to rotate along a first rotating axis 108B at a speed of, for example, 199 r/s (revolutions per second).

In some embodiments, to scan the outgoing light pulses and collect the returning light pulses across different horizontal and vertical angles in the field of view, first rotating axis 108B is not, or does not overlap with, the axis that is perpendicular to a reflective surface (e.g., surface 108S) of the first rotatable mirror 108 (e.g., the nominal axis 108A of first rotatable mirror 108). For example, as illustrated in FIG. 1, first rotating axis 108B can be configured to be at a first angle 108C with axis 108A, which is the axis that is perpendicular to reflective surface 108S of the first rotatable mirror 108. In some examples, first angle 108A is an angle that is greater than 0 degrees and less than 90 degrees. For instance, first angle 108A can be 10 degrees. As described in more detail below, configuring first rotating mirror 108 to rotate along first rotating axis 108B that is not the mirror's nominal axis can scan the transmitting/redirecting light pulses to the objects at different horizontal and vertical angles in the field of view, and for receiving and redirecting the corresponding returning light pulses (e.g., light pulses 112B).

With reference to FIG. 1, first rotatable mirror 108 can be configured to redirect incident light pulses of one or more light beams 107 toward second rotatable mirror 110. As illustrated in FIG. 1, based on the incident light pulses of light beams 107, first rotatable mirror 108B generates redirected light pulses 109. Redirected light pulses 109 are received by second rotatable mirror 110. In some embodiments, second rotatable mirror 110 can be configured to rotate along a second rotating axis 110B. In some examples, second rotatable mirror 110 can be configured to rotate at a speed that is different from the rotation speed of the first rotatable mirror 108. For example, the first rotatable mirror 108 can rotate at 199 r/s and the second rotatable mirror 110 can rotate at 189 r/s.

In some embodiments, to scan the transmitting light beam 111 at different horizontal and vertical angles in the field of view, second rotating axis 110B is not, or does not overlap with, the axis that is perpendicular to a reflective surface (e.g., surface 110S) of the second rotatable mirror 110 (e.g., the nominal axis 110A of second rotatable mirror 110). For example, as illustrated in FIG. 1, second rotating axis 110B can be configured to be at a second angle 110C with axis 110A, which is the axis that is perpendicular to a reflective surface 110S of the second rotatable mirror 110. In some embodiments, second angle 110C is an angle that is greater than 0 degrees and less than 90 degrees. For example, second angle 110C can be 8 degrees. Second angle 110C can be the same or different from first angle 108C (e.g., first angle 108C is 10 degrees, and second angle 110C is 8 degrees). As described in more detail below, configuring the second rotating mirror 110 to rotate along second rotating axis 110B that is not the nominal axis can scan the transmitting/redirecting light pulses to the objects at different horizontal and vertical angles in the Field of View ("FOV"), and for receiving and redirecting the corresponding returning light pulses (e.g., light pulses 112A).

In some embodiments, both first angle 108C and second angle 110C can be different from 90 degrees (e.g., greater than 0 degree and less than 90 degree). That is, both first rotatable mirror 108 and second rotatable mirror 110 are rotated at an angle with respect to their respective nominal axes (e.g., axes 108A and 110A). Configuring the mirrors in this manner can scan the transmitting/redirecting light pulses to the objects at different horizontal and vertical angles in the field of view and thus increase the scanning range and density of LiDAR scanning system 100.

With reference to FIG. 1, second rotatable mirror 110 receives redirected light pulses 109 from first rotatable mirror 108, and generates and transmits steered light pulses 111 in both the horizontal and vertical directions to illuminate objects in the FOV. It is appreciated that the direction of steered light pulses 111 shown in FIG. 1 only illustrates the direction at a particular point of time. In other points in time, steered light pulses 111 can be transmitted in other directions to illuminate objects in the FOV.

In some embodiments, first rotatable mirror 108 and second rotatable mirror 110 can be near 100% reflective mirrors that are disposed along the optical path for collecting returning light pulses 112A (and redirected returning light pulses 112B-C). As illustrated in FIG. 1, one or more steered light pulses 111 illuminate one or more objects in the FOV and are reflected or scattered. Some of the reflected or scattered light pulses return to second rotatable mirror 110 as returning light pulses 112A. Second rotatable mirror 110 redirects returning light pulses 112A to generate redirected returning light pulses 112B in a substantially reverse direction of redirected light pulses 109. As described above, second rotatable mirror 110 can be configured to rotate about second rotating axis 110B that is at second angle 110C (e.g., an 8-degree angle) to the mirror's nominal axis 110A.

As shown in FIG. 1, first rotatable mirror 108 redirects redirected returning light pulses 112B to generate second redirected returning light pulses 112C. In some embodiments, as described above, first rotatable mirror 108 can be configured to rotate along first rotating axis 108B that is at first angle 108C (e.g., a 10-degree angle) to the mirror's nominal axis 108A. As a result, first rotatable mirror 108 can be configured to direct second redirected returning light pulses 112C toward the optical element 104, which in turn generates third redirected returning light pulses 112D that are collected by the receiving optical system 114. Receiving optical system 114 can include, for example, a converging lens 115 and a light detector 116. Light detector 116 can include one or more light detector elements. Converging lens 115 is configured to collect and direct second redirected returning light pulses 112C to light detector 116. The converging lens 115 can be made from any transparent material such as high index glass, plastic, or the like. FIG. 1 illustrates an exemplary position that receiving optical system 114 may be disposed. It is appreciated that receiving optical system 114 can be disposed at any desired position to effectively collect a substantial portion of third redirected returning light pulses 112D.

In some embodiments, receiving optical system 114 can include a light detector 116 that includes an array of light detector elements. For example, light detector 116 can include an array of 16 detector elements for detecting light pulses collected by converging lens 115. The number of detector elements in the array can be the same as or different from the number of light emitting devices (e.g., devices 302A-D and 304A-D described in more detail below) in light source 102. For example, the number of detector elements can be 16 and the number of light emitting devices can be 4. The higher number of detector elements can increase the resolution of the LiDAR scanning results.

In some embodiments, one of the first rotatable mirror 108 and second rotatable mirror 110 can be replaced with an oscillation mirror or a Galvo mirror. An oscillation mirror can oscillate about an axis at a predetermined frequency or rate. Similar to a rotatable mirror, the oscillation mirror can redirect light pulses to illuminate the objects in the FOV and collect and redirect returning light pulses to the receiving optical system and light detector. In some embodiments, the oscillation frequency or rate of an oscillation mirror can be configured based on the scanning range requirement and/or the scanning density requirement.

Figure 2A:
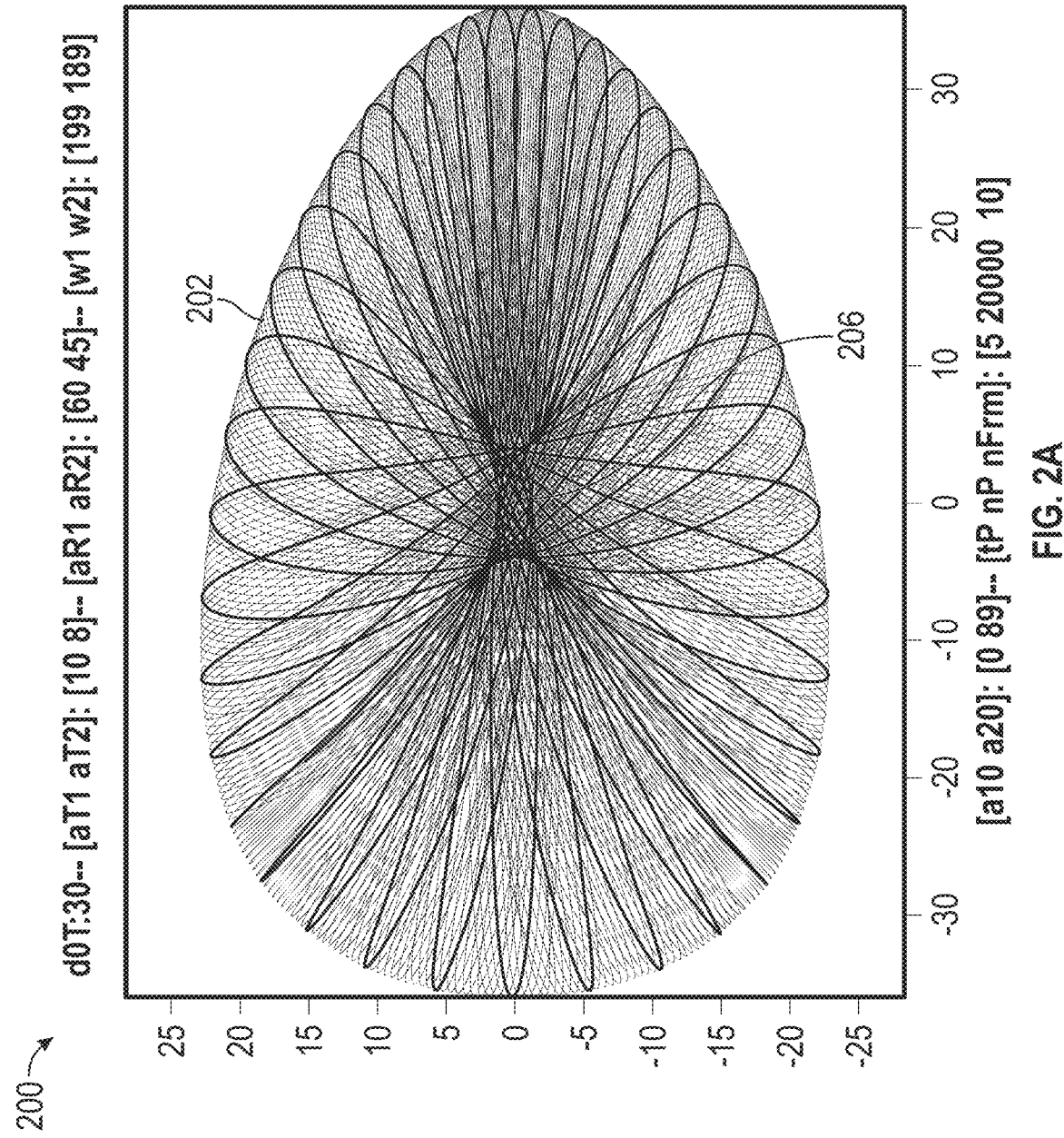
FIG. 2A illustrates a diagram of exemplary scanning results of an exemplary LiDAR system that includes a beam steering apparatus having two rotatable mirrors.
Figure 2B:
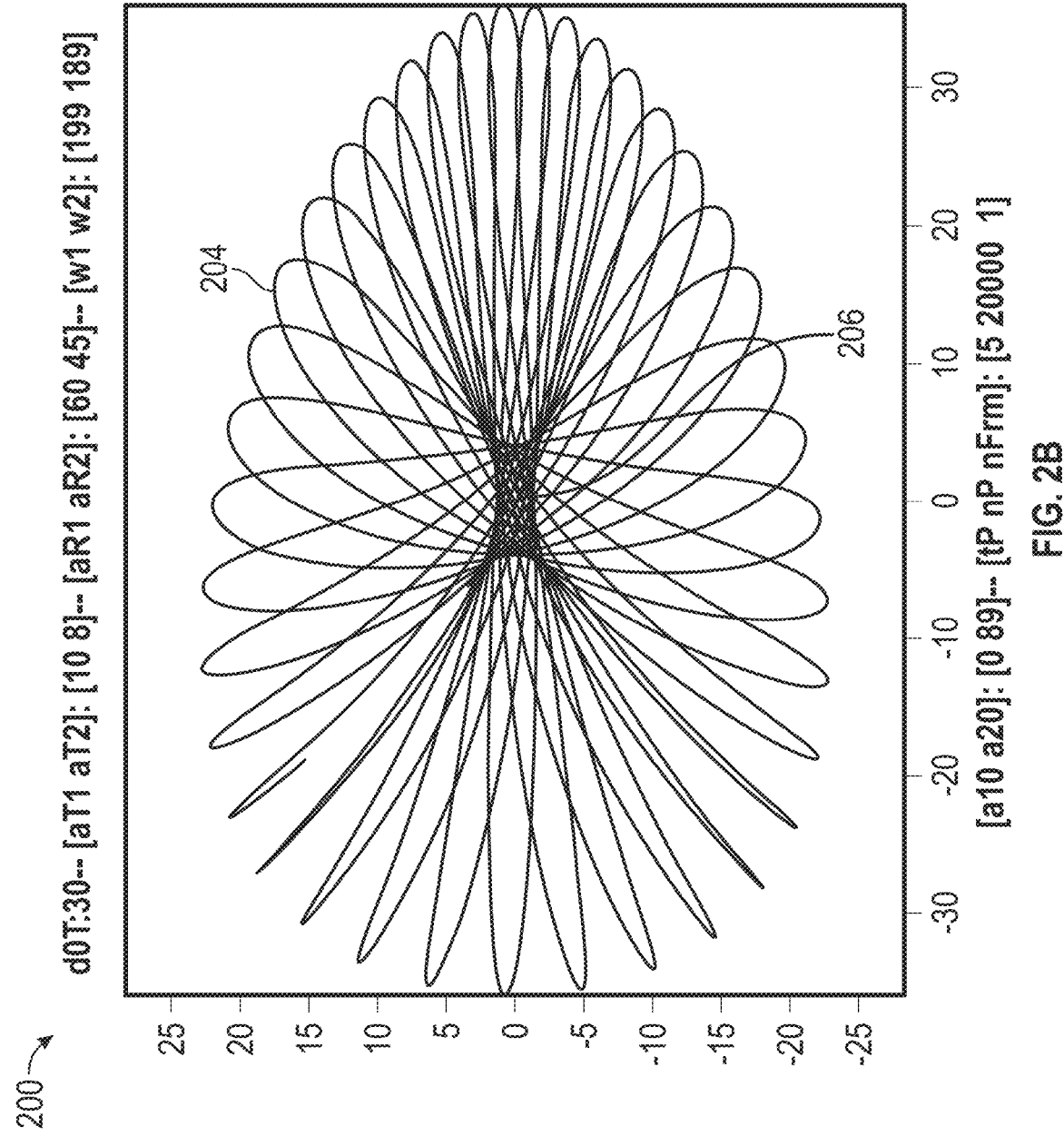
FIG. 2B illustrates a diagram of a single frame of the exemplary scanning results of an exemplary LiDAR system that includes a beam steering apparatus having two rotatable mirrors.

FIG. 2A illustrates a diagram 200 of exemplary scanning results of an exemplary LiDAR system 100 that includes a beam steering apparatus having two rotatable mirrors (e.g., mirrors 108 and 110). FIG. 2B illustrates a diagram of a single frame of the exemplary scanning results shown in FIG. 2A. The scanning results illustrated in FIG. 2A represent scanning patterns 202 of multiple frames collected/integrated over a predetermined period of time (e.g., 1 second or 10 seconds); and the scanning result illustrated in FIG. 2B represents the scanning patterns 204 of a single frame (e.g., collected over 0.1 second). In FIGS. 2A and 2B, the horizontal axis indicates the scanning range in the horizontal scanning direction (e.g., corresponding to the x direction shown in FIG. 1); and the vertical axis can indicate the scanning range in the vertical scanning direction (e.g., corresponding to the y direction shown in FIG. 1).

As shown in FIGS. 2A and 2B, the horizontal scanning range of this particular configuration of LiDAR scanning system 100 can be, for example, about −35 degree to 35 degree; and the vertical scanning range can be, for example, about −21 degree to 21 degree. As further shown in FIGS. 2A and 2B, in some embodiments, the center portion 206 of the scanning patterns 202 and 204 can have a higher density than other portions of the scanning patterns. The higher density of scanning is often desirable because it can provide a higher resolution LiDAR scanning. As described above, the higher scanning density in the center portion 206 is obtained as a result of configuring both first rotatable mirror 108 and second rotatable mirror 110 to rotate about a rotating axis (e.g., 108B and 110B) that does not overlap or align with the nominal axis of the respective mirror.

In some embodiments, one or more attributes of LiDAR scanning system 100 are customizable. For example, one or more attributes of LiDAR scanning system 100 can be configured to obtain desired scanning ranges and scanning density based on a scanning range requirement and/or a scanning density requirement. As one example, based on the scanning range and density requirements, first rotatable mirror 108 can be configured to rotate at a speed of 199 r/s; the first angle 108C (e.g., the angle between the first rotating axis 108B and nominal axis 108A) can be configured to be about 10 degrees; the second rotatable mirror 110 can be configured to rotate at a speed of 189 r/s; and the second angle 110C (e.g., the angle between the second rotating axis 110B and nominal axis 110A) can be configured to be about 8 degrees. Based on such configuration, the horizontal scanning range can be, for example, about −35 degree to 35 degree; the vertical scanning range can be, for example, about −21 degree to 21 degree; the high-density center portion 206 can have a horizontal scanning range of about 8 degrees and vertical scanning range of 3 degrees. As described above, high-density center portion 206 can correspond to a scanning area in the FOV that is predetermined to have more objects or has a heightened level of detection requirement (e.g., the nearby front area of a LiDAR scanning system mounted on a vehicle).

In some embodiments, having horizontal scanning range that is greater than the vertical scanning range is often desirable. For example, in an FOV, scanning more area across the horizontal direction (e.g., the x direction shown in FIG. 1 such as the direction that is parallel to the road surface) is often desirable than scanning more area across the vertical direction (e.g., the y direction shown in FIG. 1 such as the direction that is perpendicular to the road surface). This is because typically, more objects (e.g., human, building, animals, etc.) are disposed across the horizontal direction (e.g., on a road surface) than disposed across the vertical direction. Thus, for a LiDAR scanning system to be able to scan more area in the FOV, it is typically desirable to have a higher horizontal scanning range than a vertical scanning range.

In some embodiments, one or more attributes of first rotatable mirror 108 and second rotatable mirror 110 can be configured to be the same. In other embodiments, they can be configured to be different. For example, as illustrated in FIGS. 1, 2A and 2B, first angle 108C (e.g., 10 degrees) can be configured to be different from second angle 110C (e.g., 8 degrees); and the rotating speed of first rotatable mirror 108 (e.g., 199 r/s) can be configured to be different from rotating speed of second rotatable mirror 110 (e.g., 189 r/s). The rotating speed of a rotatable mirror can determine the distance between neighboring scanning lines. The rotating speed difference between the first rotatable mirror 108 and second rotatable mirror 110 can determine the rate of scanning (e.g., determine the scanning range in one second).

With reference to FIGS. 1 and 2A-2B, in some embodiments, light source 102 can be configured to generate the one or more light beams 107 at a frequency in accordance with the scanning density requirements associated with one or more scanning directions. For example, because the scanning density is a function of the spacing between two adjacent scanning lines and the spacing is a function of the scanning frequency, the frequency of the light beams 107 can be adjusted to obtain the desired scanning density at different portion of the scanning pattern. For instance, to obtain a higher scanning density in the center portion of the FOV than in the edge portions of the FOV, the scanning frequency of light source 102 can be configured to be higher when scanning the center portion of the FOV than when scanning the edge of the FOV. Further, in some embodiments, a scanning frequency of light source 102 can also be configured to be different from the scanning frequencies of other light sources in adjacent LiDAR scanning systems to avoid interference.

With reference to FIGS. 1 and 2A-2B, in some embodiments, light source 102 can be configured to transmit the or more light beams 107 at a direction in accordance with scanning range requirements of one or more scanning directions. For example, as shown in FIG. 1, light source 102 can be configured to transmit light beams 107 along the z direction (e.g., no tilt with respect to the z direction). As a result shown in FIGS. 2A and 2B, with this configuration, the scanning range in the vertical direction (e.g., the y direction) can be about −21 degrees to 21 degrees (i.e., total about 42 degrees) and the scanning range in the horizontal direction (e.g., the x direction) can be about −35 degrees to 35 degrees (i.e., total about 70 degrees).

Figure 2C:
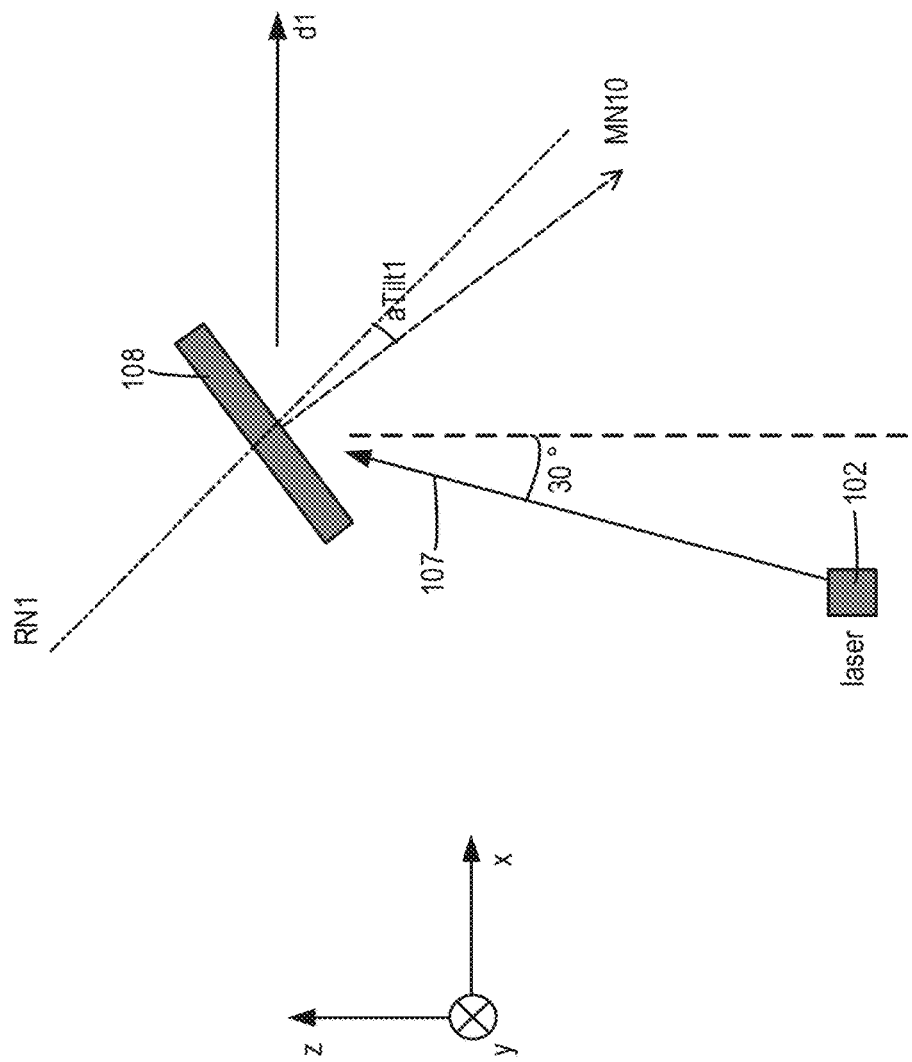
FIG. 2C illustrates an exemplary LiDAR scanning system that includes a light source that transmits light beams at an angle based on scanning range requirements.

With reference to FIG. 2C, in some embodiments, light source 102 can be configured to transmit light beams 107 at an angle to the z direction. The angle can be more than 0 degrees and less than 90 degrees. For instance, as described above, a wider scanning range in the horizontal direction is typically desirable and thus to further increase the horizontal scanning range (and reduce the vertical scanning range), light source 102 can be configured to transmit light beams 107 at about 30 degrees angle to the z direction (i.e., tilted with respect to the z direction).

Figure 4B:
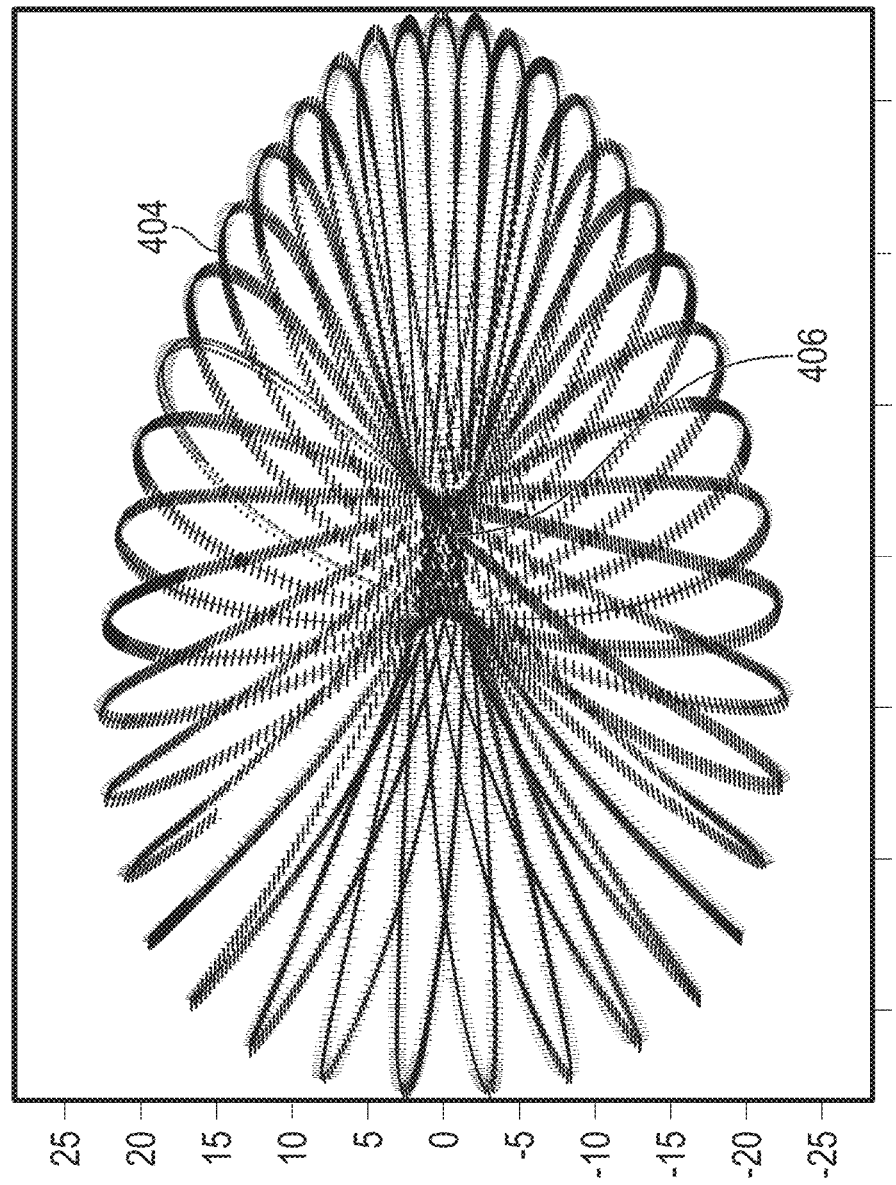
FIG. 4B illustrates a single frame of the exemplary scanning results of an exemplary LiDAR scanning system that includes a light source having multiple light emitting devices.

FIGS. 3A-3B illustrates exemplary configurations of a light source 102. In some embodiments, light source 102 can include a plurality of light emitting devices. Each of the light emitting devices can generate, for example, a laser beam. As shown in FIG. 3A, light source 102 can include a plurality of light emitting devices 302A-D forming a rectangular-shaped array. As another example shown in FIG. 3B, light source 102 can include a plurality of light emitting devices 304A-D having a cross-shape. In some embodiments, each of the light emitting devices 304A-D can include a plurality of light emitting elements. In some embodiments, the light detector 116 as shown in FIG. 1 can include a plurality of light detecting elements that are disposed in the same pattern or shape (e.g., a rectangular-shaped array or a cross-shape) as the light emitting devices. The number of the light emitting devices in a light source may or may not be the same as the number of the light detecting elements in a corresponding light detector. It is appreciated that light source 102 can include any number of light emitting devices forming any desired shapes based on the scanning range and scanning density requirements. For example, using 2-4 light emitting devices in a cross-shaped configuration, light source 102 can increase the scanning density in both the horizontal and vertical directions. FIGS. 4A-4B illustrate exemplary scanning results of LiDAR scanning system 100 that includes a light source 102 having multiple light emitting devices.

As shown in FIGS. 4A-4B, in some embodiments, using a plurality of light emitting devices can further increase the scanning density by generating multiple scanning points or lines in the scanning results. For example, the LiDAR scanning results shown in FIGS. 2A-2B are generated by a LiDAR scanning system having a light source with a single light emitting device. The LiDAR scanning results shown in FIGS. 4A-4B are generated by a LiDAR scanning system 100 having a light source with multiple (e.g., 4) light emitting devices (e.g., devices 304A-D). The LiDAR scanning results shown in FIGS. 2A-2B and 4A-4B are obtained using similar attributes of the rotatable mirrors (e.g., similar rotating speed, similar tilting angles, etc.). As shown in FIGS. 4A-4B, the scanning ranges of a system having multiple light emitting devices in both the horizontal and vertical directions are similar to a system having a single light emitting device; while the scanning density of the former system is higher than the latter system in both scanning directions. Moreover, using a system having multiple light emitting devices, the scanning density of the center portion 406 can also be further increased to provide a higher resolution scanning result.

With reference back to FIGS. 3A-3B, in some embodiments, each of the light emitting devices (e.g., devices 302A-D and 304A-D) can generate and transmit light beams independently from each other. Transmitting light beams from different light emitting devices independently allows multiple light detectors in a LiDAR scanning system to share an amplifier and analog-to-digital converter, thereby reducing the overall dimension of the LiDAR scanning system and also improving the efficiencies of the system. In some embodiments, a single light emitting device in a light source 102 can be configured to transmit an elongate light beam (e.g., from a diode laser), thus enabling a configuration of using one light emitting device for multiple light detectors. This further reduces the overall dimension of the LiDAR scanning system and improves the effective resolution and scanning density. It is appreciated that based on the resolution, scanning range, and scanning density requirements, LiDAR scanning system 100 can be configured to include any number of light emitting devices and any number of light detectors.

With references to FIG. 3C, in some embodiments, at least two of the plurality of light emitting devices can be configured to transmit light beams having different polarizations. For example, as shown in FIG. 3C, a light source 102 includes two light emitting devices 308A and 308B disposed at about 90 degree angle with respect to each other (e.g., as part of a cross-shaped configuration shown in FIG. 3B). Light emitting device 308A can be configured to transmit a light beam 307A having a horizontal polarization; and light emitting device 308B can be configured to transmit a light beam 307B having a vertical polarization. As shown in FIG. 3C, to direct both light beams 307A and 307B to a rotatable mirror (not shown in FIG. 3C), a polarization-sensitive device 309 can be disposed in the optical path of both light beams 307A and 307B. The polarization-sensitive device 309 allows horizontally-polarized light (parallel to the paper surface) to pass through; and reflects the vertically-polarized light (perpendicular to the paper surface) to a substantially 90 degree direction. Accordingly, light beams 307A and 307B can both be directed to a same direction.

Figure 5:
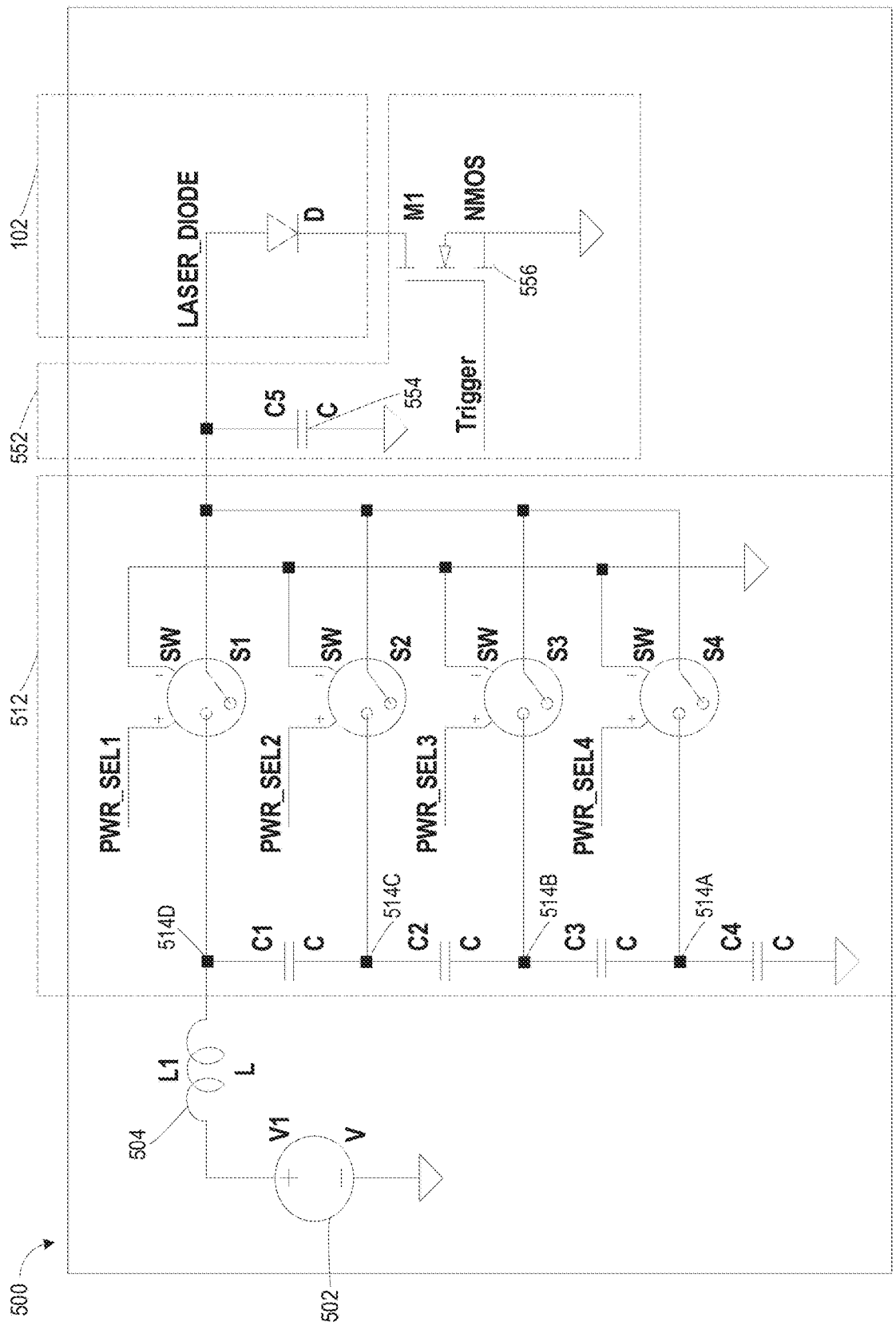
FIG. 5 illustrates a circuit diagram of an exemplary driver circuit configured to provide electrical power to a light source of the LiDAR scanning system.

FIG. 5 illustrates a circuit diagram of an exemplary driver circuit 500 configured to provide electrical power to a light source of a LiDAR scanning system (e.g., system 100). As illustrated in FIG. 5, in some embodiments, driver circuit 500 can include an electrical power source 502, a current limiting device 504, a power controller 512, and a power delivery circuit 552. Driver circuit 500 is electrically coupled to light source 102. As shown in FIG. 5, light source 102 can include, for example, a light emitting device that generates light beams (e.g., a 905 nm laser beam).

With reference to FIG. 5, in some embodiments, electrical power source 502 can be a voltage source and/or a current source. Electrical power source 502 can be coupled to power controller 512 using an electrical wire and optionally current limiting device 504. Current limiting device 504 limits the electrical current to protect the components of driver circuit 500 from electrical overstress. Current limiting device 504 can be, for example, an inductor and/or a resistor.

With reference to FIG. 5, power controller 512 is configured to control a level of the electrical power to-be-delivered to light source 102. In some embodiments, power controller 512 includes a voltage divider circuit configured to generate a plurality of discrete voltage levels. As shown in FIG. 5, an exemplary voltage divider circuit include a plurality of capacitors C1-C4 coupled in a serial manner. For example, a first terminal of capacitor C1 is electrically coupled to the current limiting device 504; a second terminal of capacitor C1 is electrically coupled to a first terminal of capacitor C2; a second terminal of capacitor C2 is electrically coupled to a first terminal of capacitor C3; and so forth. The second terminal of capacitor C4 is electrically coupled to an electrical ground. The voltage divider as shown in FIG. 5 can provide an output voltage that is a fraction of its input voltage. For example, for a DC input voltage applied at coupling point 514D, the voltage divider can generate a plurality of discrete voltage levels at each coupling point 514A-C. Each of the discrete voltage levels can be a different fraction of the voltage at coupling point 514D depending on the capacitance of capacitors C1-C4. It is appreciated that the capacitance of capacitors C1-C4 can be configured in any desirable manner (e.g., the same or different), and the voltage divider circuit of power controller 512 can include any number of capacitors, resistors, inductors, or a combination of these electrical components. For example, in some embodiments, capacitors C1-C4 can be replaced with resistors R1-R4.

In some embodiments, power controller 512 can further include a plurality of switches configured to enable selection of the plurality of discrete voltage levels at coupling point 514A-514D. As shown in FIG. 5, in some embodiments, power controller 512 includes switch S1-S4 that are controllable by a plurality of control signals PWR_SEL1 to PWR_SEL4, respectively. For example, if the control signal PWR_SEL4 is enabled and other control signals are disabled, switch S4 can be closed and the voltage at coupling point 514A can be selected and coupled to power delivery circuit 552. And if the control signal PWR_SEL3 is enabled and other control signals are disabled, switch S3 can be closed and the voltage at coupling point 514B can be selected and coupled to power delivery circuit 552; and so forth. It is appreciated that the number of control signals can be configured corresponding to the number of discrete voltage levels in the voltage divider.

In some embodiments, the power controller 512 can be configured to control the level of the electrical power to-be-delivered to the light source 102 for each light pulse. For example, the power selection signal PWR_SEL4 can be enabled to close switch S4 for a first light pulse, and the power selection signal PWR_SEL3 can be enabled to close switch S3 for a second light pulse. As a result, different light pulses can have different power levels. In some embodiments, the controlling of power levels for light pulses can be based on the objects in the FOV. For example, the power levels of light pulses can be adjusted according to the distance and geometry of the objects in the FOV. The power levels can also be adjusted based on the prior received optical power at the light detector. For example, the adjusting of the power levels can be part of a feedback and/or feedforward control loop. If the prior received optical power is determined to be low, insufficient, or otherwise undesirable (e.g., the power level of the detected returning light pulses is low, which may indicate an object is located far away from the LiDAR scanning system or that the object is absorbing the transmitted light pulses at a high level), the power level can be increased for the next light pulse.

As shown in FIG. 5, power controller 512 can be electrically coupled to power delivery circuit 552. In some embodiments, power delivery circuit 552 includes a charge storage device 554 configured to store electrical charges corresponding to the level of the electrical power to-be-delivered to the light source 102. Charge storage device 554 can be, for example, a capacitor. Power delivery circuit 552 can also include a charge releasing device 556 configured to receive a trigger signal; and in response to receiving the trigger signal, deliver the stored electrical charges to the source 102. As shown in FIG. 5, power control signals PWR_SEL1-PWR_SEL4 controls the voltage level at the input terminal of charge storage device 554, which stores the charge over a period of time. For delivering the stored charge to light source 102 (e.g., a light emitting diode), a trigger signal can be enabled to turn on the charge releasing device 556. The trigger signal can be configured to turn on and off the charge releasing device 556 at a pre-determined rate or frequency such that one or more light pulses are generated from light source 102.

Figure 6:
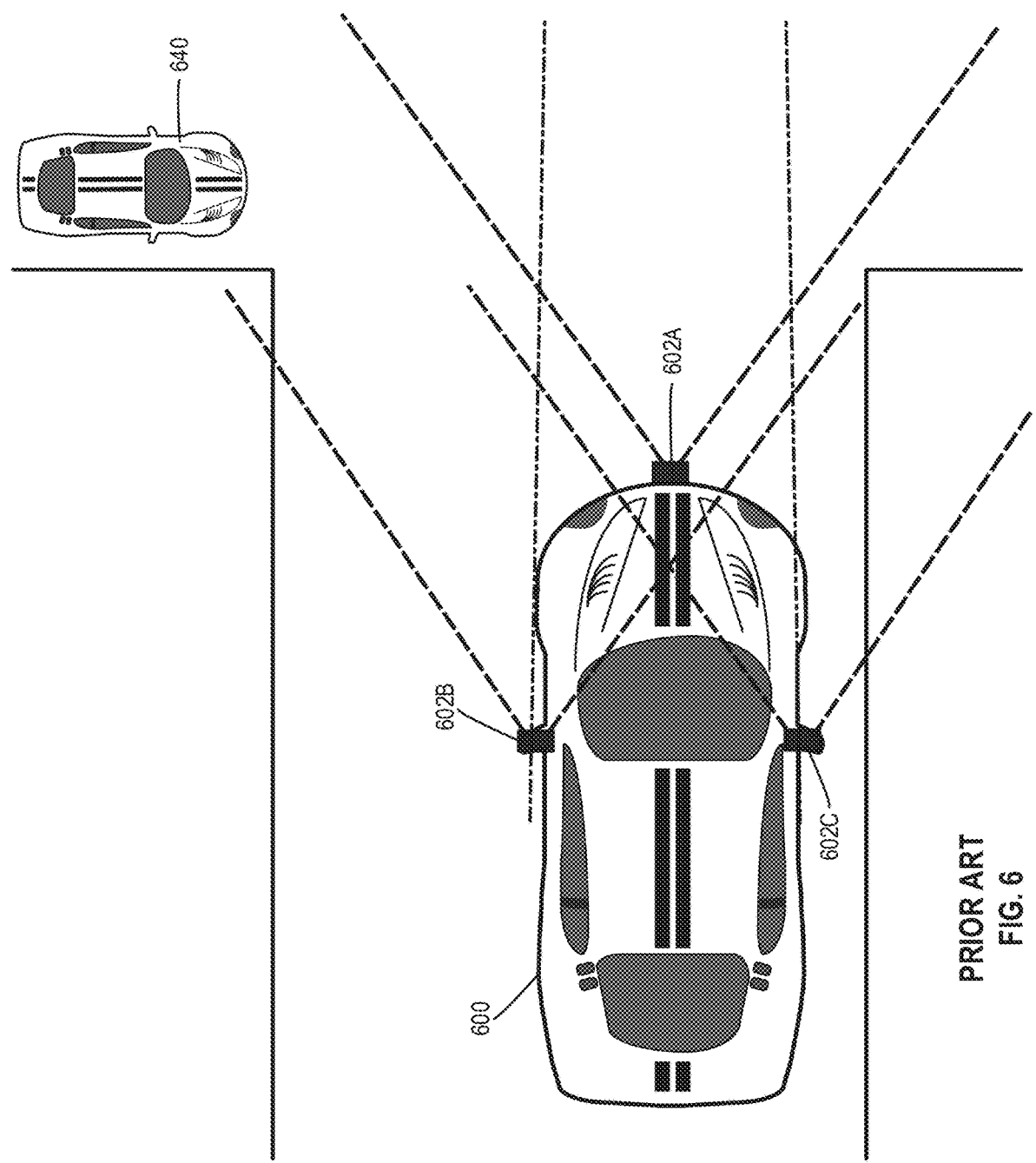
FIG. 6 illustrates a typical configuration of multiple LiDAR systems attached to a vehicle.

FIG. 6 illustrates a typical configuration of multiple LiDAR systems disposed with a vehicle 600. As shown in FIG. 6, for example, in a typical configuration, LiDAR system 602A is attached to vehicle 600 at the middle front; LiDAR system 602B is attached to vehicle 600 at the driver side rear-view mirror; and LiDAR system 602C is attached to vehicle 600 at the passenger side rear-view mirror. In this typical configuration, the FOV of the LIDAR systems 602A-C may have gap and thus the LiDAR systems may be unable to detect some objects in the surrounding environment of vehicle 600. As shown in FIG. 6, the FOV of LiDAR system 602A (indicated by the two lines extending from system 602A) may not be wide enough to detect a vehicle 640 that is approaching an intersection. While the FOV of LiDAR system 602B (indicated by the two lines extending from system 602B) may be able to cover the area of vehicle 640, the scanning light pulses from system 602B may be obstructed, for example, by a building at the intersection, such that vehicle 640 cannot be detected. As a result, there is a gap of scanning between system 602A and 602B, and accident may occur at the intersection. Thus, this typical configuration of disposing the LiDAR systems in a vehicle may not meet the safety requirements.

Figure 7:
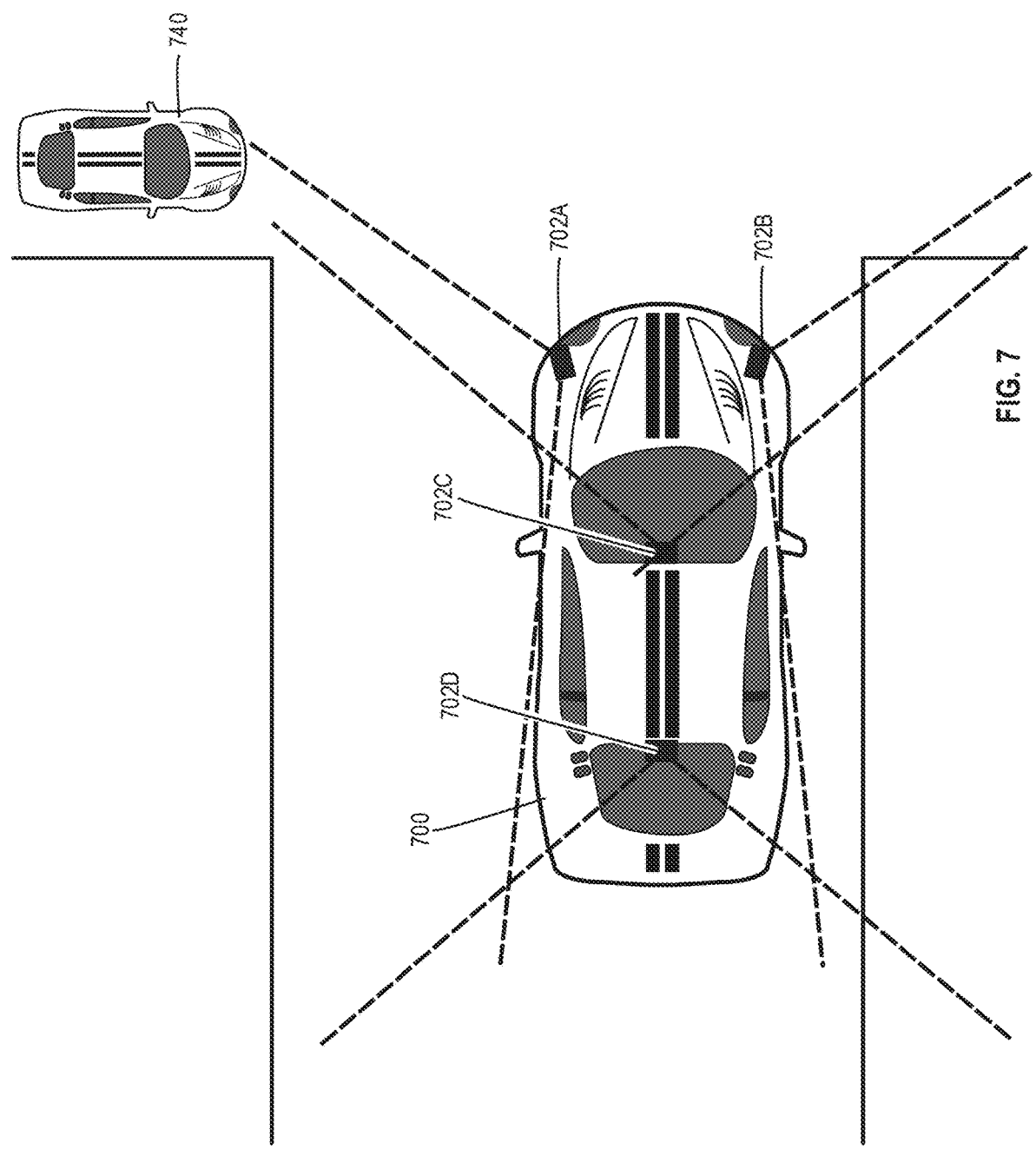
FIG. 7 illustrates an exemplary configuration of multiple LiDAR systems attached to a vehicle.

FIG. 7 illustrates an exemplary configuration of multiple LiDAR systems attached to a vehicle 700. As shown in FIG. 7, in this configuration, a LiDAR scanning system 702A can be disposed approximately at the front-left corner of vehicle 700; a LiDAR scanning system 702B can be disposed approximately at the front-right corner of vehicle 700; and a LiDAR scanning system 702C can be disposed approximately at the top portion of a front window-shield of vehicle 700. Further, in some embodiments, one or more additional LiDAR systems can be optionally disposed at other part of vehicle 700. For example, LiDAR system 702D can be disposed approximately at the top portion of a rear window of vehicle 700.

As shown in FIG. 7, the FOV of LiDAR system 702A (indicated by the two lines extending from system 702A) can be configured to encompass a substantial portion of the left side of vehicle 700; the FOV of LiDAR system 702B can be configured to encompass a substantial portion of the right side of vehicle 700; and the FOV of LiDAR system 702C can be configured to encompass a substantial front portion of a front side of vehicle 700. The LiDAR systems 702A-C can be configured such that the FOVs of the multiple LiDAR systems 702A-C overlap with each other and do not leave a gap. In this configuration, for example, a vehicle 740 that approaches the intersection can be detected by at least one of LiDAR system 702A or 702C. As a result, the objects in the surrounding environment of vehicle 700 can be properly detected and potential blind spot can be eliminated to reduce or eliminate the likelihood of collision.

Figure 8:
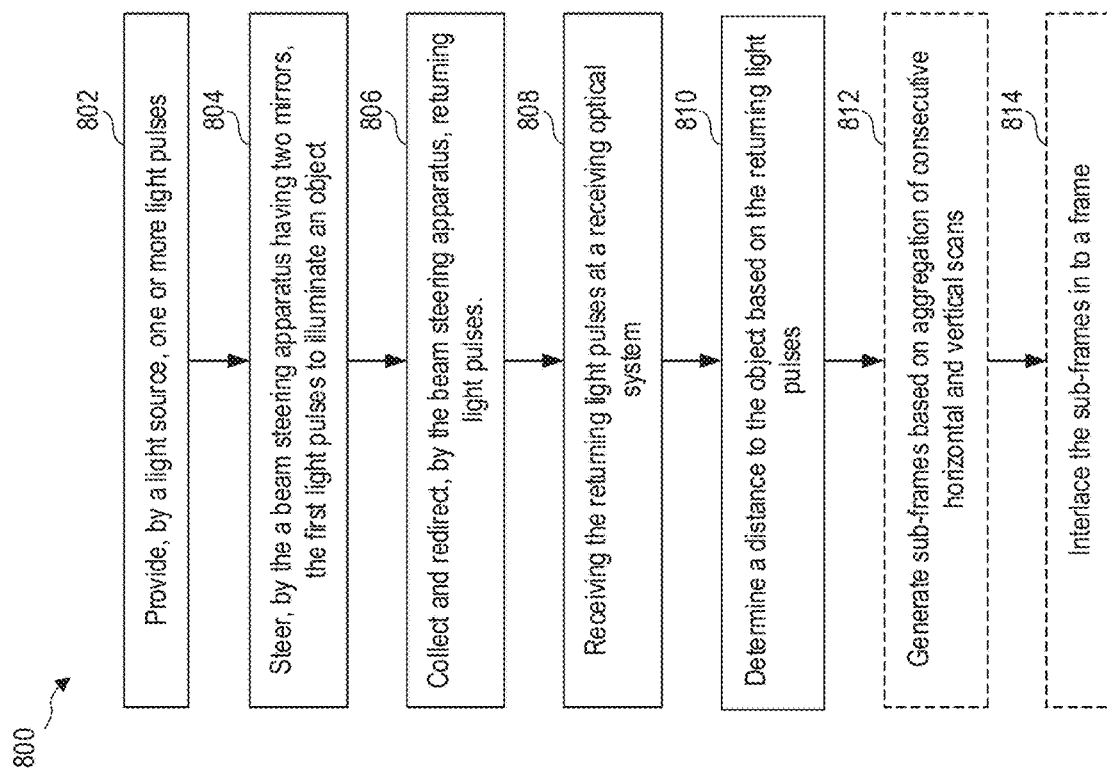
FIG. 8 illustrates an exemplary flow chart for a method of determining time of flight of one or more light pulses, according to examples of the disclosure.

FIG. 8 illustrates an exemplary flow chart 800 for a method of determining time of flight of one or more light pulses for generating a 3D image using a LiDAR scanning system (e.g., system 100 depicted in FIG. 1). With reference to FIG. 8, at block 802, one or more light pulses (e.g., short laser light pulses having a pulse width of about 0.01 nanosecond to 5 nanoseconds or light pulses having a pulse width of 5 nanoseconds to 30 nanoseconds or longer) can be generated from a light source of the LiDAR scanning system. At block 804, a beam steering apparatus can steer or scan the one or more light pulses across the field-of-view in both horizontal and vertical directions. The beam steering apparatus can include two mirrors (e.g., two rotatable mirrors, one rotatable mirror and one oscillation mirror, or one rotatable mirror and one Glavo mirror). The steered one or more light pulses, or a portion thereof, illuminate an object and are scattered or reflected in one or more directions. In some embodiments, a portion of the scattered or reflected light pulses can return to the LiDAR scanning system and reach a collection aperture of the LiDAR scanning system.

At block 806, the one or more returning light pulses can be collected and/or redirected by the beam steering apparatus toward a receiving optical system. At block 808, the one or more redirected returning light pulses can be received at the receiving optical system including, for example, a converging lens and one or more light detectors. At block 810, a distance to the object can be determined based on the returning light pulses. For example, the one or more light detectors convert photons of the redirected returning light pulses that reach the light detectors to one or more electrical signals. The one or more output electrical signals generated by the light detector can be amplified using an amplification circuit or device by a predetermined factor. The amplified one or more electrical signals can be sampled and converted to a digital value at a predetermined sampling rate. In some embodiments, the digitized signal data can be collected within a time period of the expected maximum time-of-flight (ToF) corresponding to the farthest object in the field-of-view. The digitized signal data can be analyzed to determine the ToF of one or more returning light pulses, and determine the distance from the LiDAR scanning system to the reflection or scattering points of the objects.

In some embodiments, at optional block 812, a microcontroller can generate one or more sub-frames based on aggregation of the distances to one or more objects across successive or consecutive horizontal and vertical scans. At optional block 814, the microcontroller can interlace the one or more sub-frames to form a frame with higher resolution.

It is understood that the specific order or hierarchy of blocks in the processes and/or flowcharts disclosed is an illustration of exemplary approaches. Based upon design preferences, it is understood that the specific order or hierarchy of blocks in the processes and/or flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C.

Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed under 35 U.S.C. § 112(f) unless the element is expressly recited using the phrase "means for."

What is claimed is:

1. A light detection and ranging (LiDAR) scanning system, comprising:
   a light source configured to generate a plurality of light pulses;
   a power controller comprising a plurality of power switches, wherein the plurality of power switches comprises circuitry of a first power switch and circuitry of a second power switch, the first power switch and the second power switch are controllable to select respective different power levels for at least two respective consecutive light pulses of the plurality of light pulses;
   a first mirror and a second mirror,
      wherein at least one of the first mirror or the second mirror is configured to move about a respective axis that does not overlap with a respective normal axis of the first mirror or the second mirror, and
      wherein the first mirror and the second mirror, when moving with respect to each other, are configured to:
         scan the plurality of light pulses both vertically and horizontally to a field-of-view, and
         redirect one or more returning light pulses generated based on the scanned light pulses; and
   a receiving optical system configured to receive redirected returning light pulses.

2. The system of claim 1, wherein the first mirror is a rotatable mirror or an oscillation mirror.

3. The system of claim 1, wherein the second mirror is a rotatable mirror or an oscillation mirror.

4. The system of claim 1, wherein the first mirror is configured to rotate or oscillate about a first axis at a first rate, and wherein the second mirror is configured to rotate or oscillate about a second axis at a second rate.

5. The system of claim 4, wherein the first axis and the normal axis of the first mirror form a first angle, and wherein the second axis and the normal axis of the second mirror form a second angle, the first angle being different from the second angle.

6. The system of claim 5, wherein both the first angle and the second angle are greater than 0 degrees and no greater than 90 degrees.

7. The system of claim 4, wherein the first rate and the second rate are the same.

8. The system of claim 4, wherein the first rate and the second rate are different.

9. The system of claim 1, wherein the light source is configured to provide a higher triggering rate when the combination of the first mirror and the second mirror scans a first portion of the field-of-view than when the first mirror and the second mirror scans a second portion of the field-of-view.

10. The system of claim 1, wherein the light source is configured to transmit the plurality of light pulses to the first mirror at a direction determined based on scanning range requirements in one or both of horizontal and vertical directions, and wherein the first mirror is positioned to direct the plurality of light pulses to the second mirror.

11. The system of claim 1, wherein the light source comprises at least one of a fiber laser, a diode laser, a diode pump solid state laser, or a fiber coupled diode laser.

12. The system of claim 1, wherein the power controller is configured to provide electrical power to the light source based on one or more attributes associated with an object disposed in the field-of-view.

13. The system of claim 1, wherein the power controller further comprises:
   a voltage divider circuit configured to generate a plurality of discrete voltage levels, wherein the plurality of power switches are configured to facilitate selection of one of the plurality of discrete voltage levels.

14. The system of claim 1, further comprising a power delivery circuit configured to, prior to delivering electrical power to the light source, select a level of the electrical power deliverable to the light source based on prior received optical power, the prior received optical power being optical power of the redirected returning light pulses previously received by the receiving optical system.

15. The system of claim 14, further comprising a feedback or feedforward circuit configured to provide the optical power of the redirected returning light pulses previously received by the receiving optical system to the power delivery circuit.

16. The system of claim 14, wherein the power delivery circuit comprises:
   a charge storage device configured to store electrical charges corresponding to the level of the electrical power deliverable to the light source;
   a charge releasing device configured to:
      receive a trigger signal; and
      in response to the trigger signal, deliver the stored electrical charges to the light source.

17. The system of claim 1, further comprising a light detector comprising a plurality of light detector element, wherein the light source comprises a plurality of light emitting devices, and wherein a quantity of the plurality of light emitting devices and a quantity of the plurality of light detector elements are different.

18. The system of claim 17, wherein the plurality of light detector elements are arranged in a pattern having a same shape as a shape of a pattern in which the plurality of the light emitting devices are arranged.

19. A vehicle comprising a light detection and ranging (LiDAR) scanning system, the LiDAR scanning system comprising:
   a light source configured to generate a plurality of light pulses;
   a power controller comprising a plurality of power switches, wherein the plurality of power switches comprises circuitry of a first power switch and circuitry of a second power switch, the first power switch and the second power switch are controllable to select respective different power levels for at least two respective consecutive light pulses of the plurality of light pulses;
   a first mirror and a second mirror, wherein at least one of the first mirror or the second mirror moves about a respective axis that does not overlap with a respective normal axis of the first mirror or the second mirror, and wherein the first mirror and the second mirror, when moving with respect to each other, are configured to:

scan the plurality of light pulses both vertically and horizontally to a field-of-view, and redirect one or more returning light pulses generated based on the scanned light pulses; and a receiving optical system configured to receive redirected returning light pulses, a receiving optical system configured to receive redirected returning light pulses.

\* \* \* \* \*